US011394662B2

(12) United States Patent
Goodman et al.

(10) Patent No.: US 11,394,662 B2
(45) Date of Patent: *Jul. 19, 2022

(54) AVAILABILITY GROUPS OF CLOUD PROVIDER EDGE LOCATIONS

(71) Applicant: Amazon Technologies, Inc., Seattle, WA (US)

(72) Inventors: Alan Hadley Goodman, Issaquah, WA (US); Pranav Chachra, Seattle, WA (US); Diwakar Gupta, Seattle, WA (US); Dougal Stuart Ballantyne, Seattle, WA (US); Ishwardutt Parulkar, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,866

(22) Filed: Dec. 17, 2020

(65) Prior Publication Data

US 2021/0194825 A1 Jun. 24, 2021

Related U.S. Application Data

(63) Continuation of application No. 16/699,309, filed on Nov. 29, 2019, now Pat. No. 10,880,232.

(51) Int. Cl.
*G06F 15/16* (2006.01)
*H04L 47/70* (2022.01)
(Continued)

(52) U.S. Cl.
CPC ........... *H04L 47/828* (2013.01); *G06F 16/29* (2019.01); *H04L 47/76* (2013.01); *H04L 47/783* (2013.01); *H04L 47/821* (2013.01); *H04L 47/822* (2013.01)

(58) Field of Classification Search
CPC ..... H04L 47/828; H04L 47/76; H04L 47/783; H04L 47/821; H04L 47/822
(Continued)

(56) References Cited

U.S. PATENT DOCUMENTS 7,782,870 B1 * 8/2010 Tripathi ................ H04L 47/722
370/395.42
9,069,599 B2 * 6/2015 Martinez ................. H04L 12/66
(Continued)

OTHER PUBLICATIONS

AT&T, "AT&T's Network and Microsoft's Cloud Deliver New Customer Offerings", available online at <https://about.att.com/story/2019/microsoft.html>, Jul. 17, 2019, 3 pages.
(Continued)

*Primary Examiner* — Moustafa M Meky
(74) *Attorney, Agent, or Firm* — Nicholson De Vos Webster & Elliott LLP

(57) ABSTRACT

Techniques are described for enabling users of a cloud provider network to discover "availability groups" provided by a cloud provider network and to request the launch of computing resources into selected availability groups. Some cloud provider networks are expanding the definition of traditional "availability zones" to include new types of availability zones representing various types of provider substrate extension edge locations—including, for example, cloud-provider managed substrate extensions associated with separate control planes, 5G-enabled provider substrate extensions connected to communications service provider networks, and the like. Availability groups can be used to represent various defined collections these new types of provider substrate extensions, where each availability group may be defined such that includes a set of provider substrate extensions with a similar set of characteristics and capabilities.

20 Claims, 13 Drawing Sheets

(51) Int. Cl.
*G06F 16/29* (2019.01)
*H04L 47/783* (2022.01)
*H04L 47/76* (2022.01)

(58) Field of Classification Search
USPC ........................................................ 709/226
See application file for complete search history.

(56) References Cited

U.S. PATENT DOCUMENTS

| | | | |
|---|---|---|---|
| 9,489,647 B2* | 11/2016 | Martinez | H04L 67/10 |
| 9,503,345 B2 | 11/2016 | Caminiti et al. | |
| 10,026,070 B2 | 7/2018 | Thorpe et al. | |
| 10,296,971 B2* | 5/2019 | Buswell | H04L 47/821 |
| 10,411,975 B2* | 9/2019 | Martinez | H04L 41/5054 |
| 10,719,503 B1 | 7/2020 | Bar et al. | |
| 10,880,332 B2* | 12/2020 | Johnson | H04L 63/104 |
| 2013/0121298 A1 | 5/2013 | Rune et al. | |
| 2014/0067496 A1* | 3/2014 | Buswell | H04L 47/821 |
| | | | 705/26.3 |
| 2016/0012523 A1* | 1/2016 | Buswell | G06Q 10/0631 |
| | | | 705/26.3 |
| 2016/0321115 A1 | 11/2016 | Thorpe et al. | |
| 2017/0109245 A1 | 4/2017 | Mcalister et al. | |
| 2018/0004577 A1 | 1/2018 | Blanco et al. | |
| 2018/0302243 A1* | 10/2018 | Li | H04L 49/70 |
| 2019/0110207 A1 | 4/2019 | Makhijani et al. | |
| 2019/0228092 A1 | 7/2019 | Reyes et al. | |
| 2019/0245888 A1* | 8/2019 | Martinez | H04L 12/4633 |
| 2019/0288956 A1* | 9/2019 | Pulier | H04L 47/70 |
| 2020/0068579 A1 | 2/2020 | Hang et al. | |
| 2020/0112458 A1* | 4/2020 | Li | H04L 45/50 |
| 2020/0267093 A1* | 8/2020 | Kamachi | H04L 43/0888 |
| 2021/0014275 A1* | 1/2021 | Martinez | H04L 67/02 |
| 2021/0184985 A1* | 6/2021 | Pulier | H04L 63/0272 |

OTHER PUBLICATIONS

Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.

Notice of Allowance, U.S. Appl. No. 16/699,309, dated Aug. 21, 2020, 8 pages.

* cited by examiner

| Services |  |
|---|---|
| Edge Compute | user@example.com | Oregon | Support |

Settings

Dashboard
Settings
Events                Encryption        | Availability Zones | IDs     | Service limits           | More ▼
Tags
Reports               Below is a list of available zones for this region, US West (Oregon). You can enable zones to begin using them. When zones
Limits                are disabled, resources will continue to exist, however you will not be able to use this zone for new resources.

▼ Instances           Availability Zones
Launch templates
Reserved instances    This page lists all availability zones for this region, US West (Oregon), including Provider Substrate Extension availability
Dedicated hosts       zones. Select a different region to use provider substrate extensions there.
Scheduled instances
Capacity reservations US West (Oregon) (us-west-2) (ENABLED BY DEFAULT)                                              — 702

▼ Machine images      Availability Zones
VM machine images     us-west-2a (usw2-az2)
Container images      us-west-2b (usw2-az1)
                      us-west-2c (usw2-az3)
                      us-west-2d (usw2-az4)

▼ Volumes                                                                                      — 706
Block volumes
Snapshots             US West (Los Angeles) (us-west-2-los-1) (ENABLED)               Enabled ⬤— 704

▼ Network and security   Availability Zones
Security groups          us-west-2-los-1a (usw2-los1-az1)
Placement groups         us-west-2-los-1b (usw2-los1-az2)
Network interfaces
                      This AZ Group may contain resources
▼ Load balancing      This group can no longer bed used for new resources if disabled; existing resources will exist as normal US West (Las Vegas) (us-west-2-los-2) (DISABLED)             Disabled ⭘— 708

Availability Zones
                      us-west-2-lgs-1a (usw2-los1-az1)

This AZ Group may contain resources
                      This group can no longer bed used for new resources if disabled; existing resources will exist as normal

*FIG. 7*

AVAILABILITY GROUPS OF CLOUD PROVIDER EDGE LOCATIONS

CROSS-REFERENCE TO RELATED APPLICATIONS

This application is a continuation of U.S. patent application Ser. No. 16/699,309, filed Nov. 29, 2019, which is hereby incorporated by reference.

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which:

FIG. 7 illustrates an example graphical user interface (GUI) in which a user can view, enable, and disable availability groups for use by a user account associated with the user according to some embodiments.

DETAILED DESCRIPTION

Figure 1:
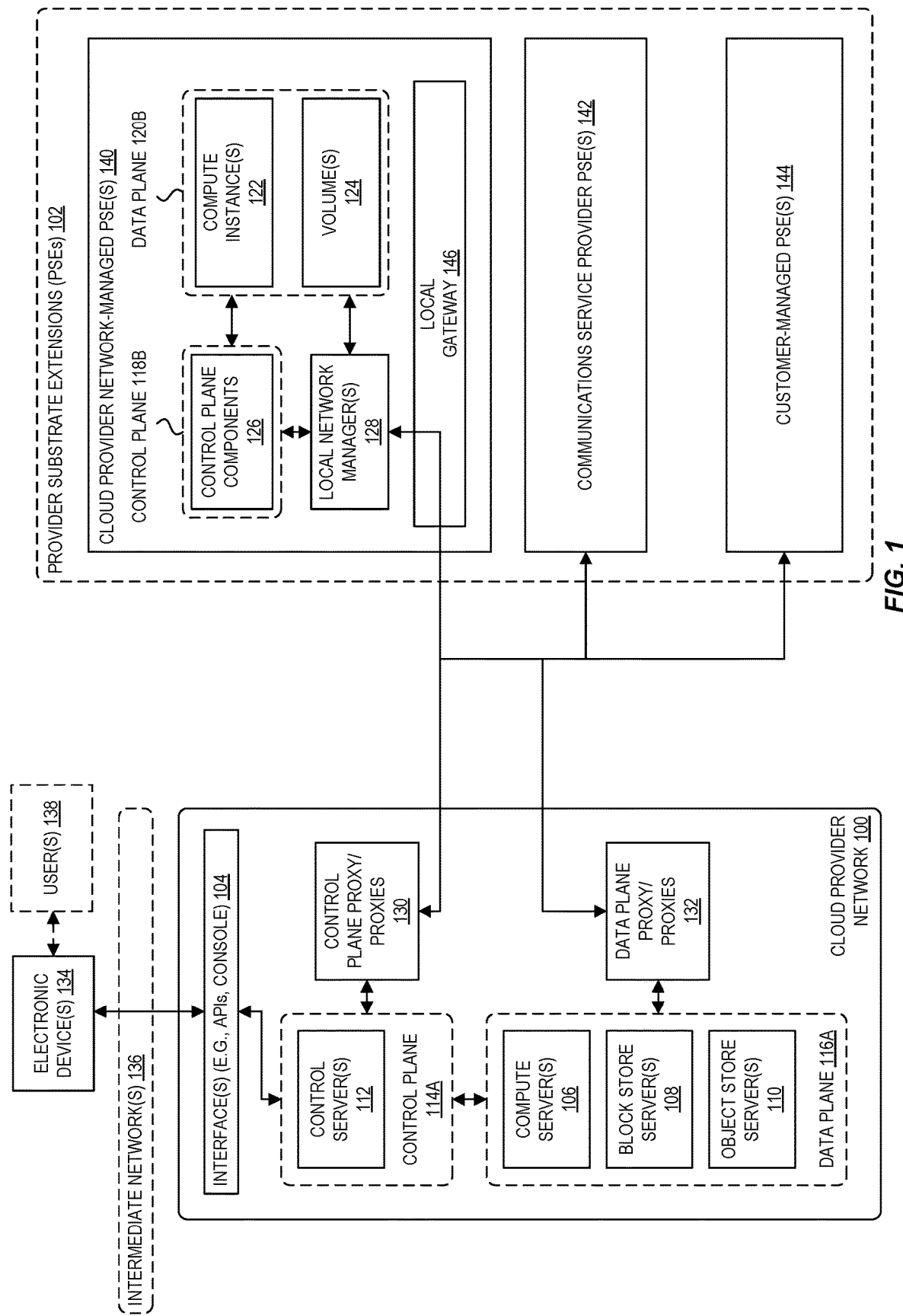
FIG. 1 illustrates an exemplary system including a cloud provider network and further including various provider substrate extensions of the cloud provider network according to some embodiments.

The present disclosure relates to methods, apparatus, systems, and non-transitory computer-readable storage media for enabling users of a cloud provider network to discover "availability groups" provided by a cloud provider network and to request the launch of computing resources into selected availability groups. Some cloud provider networks are expanding the definition of a traditional "availability zone" to include new types of zones including defined collections of provider substrate extension locations—including, for example, cloud-provider managed substrate extensions associated with a remote control plane, 5G-enabled provider substrate extensions connected to communications service provider networks, and so forth. It is desirable to enable customers to deploy computing resources across such zones without breaking backward compatibility assumptions about existing availability zones within a cloud provider network. According to embodiments described herein, a cloud provider network includes a set of availability zone groups used to group these new types of provider substrate extensions. In some embodiments, each availability zone group is defined such that includes a set of provider substrate extensions with similar characteristics and capabilities (e.g., a set of provider substrate extensions in a similar geographic area, a set of provider substrate extensions associated with communication service providers, etc.).

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands. Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a "provider substrate extension" (PSE) or "edge location" (EL)—can be provisioned within a network that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a separate control plane of the cloud provider network.

In some embodiments, yet another example of a provider substrate extension is a network deployed within a communications service provider network. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

As used herein, the computing resources of the cloud provider network installed within a communications service provider network (or possibly other networks) are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension deployed in a communication service provider network may also be referred to as a "wavelength zone."

FIG. 1 illustrates an exemplary system including a cloud provider network and further including various provider substrate extensions of the cloud provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or anew replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object store servers 110 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager. In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, a PSE 102 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
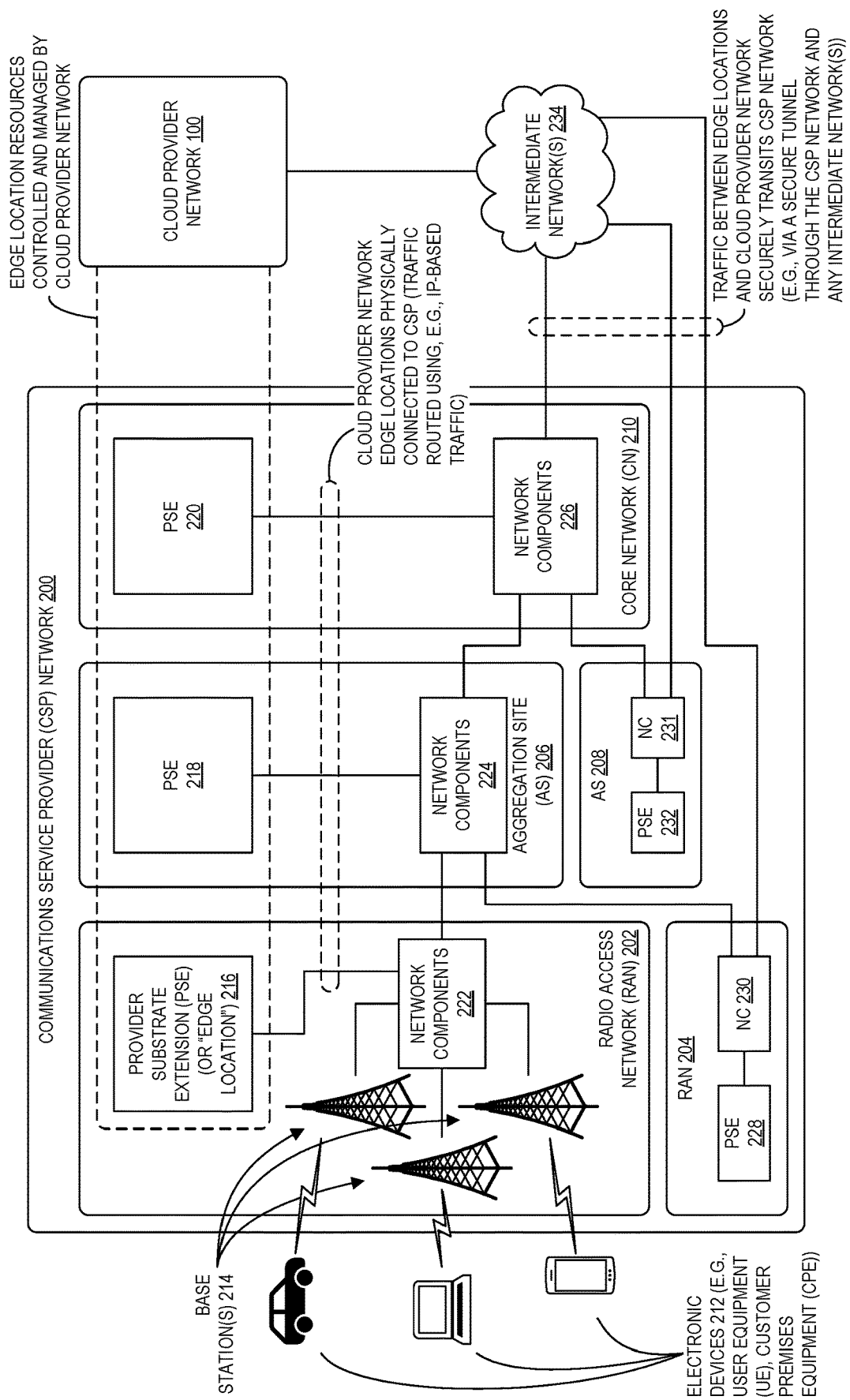
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
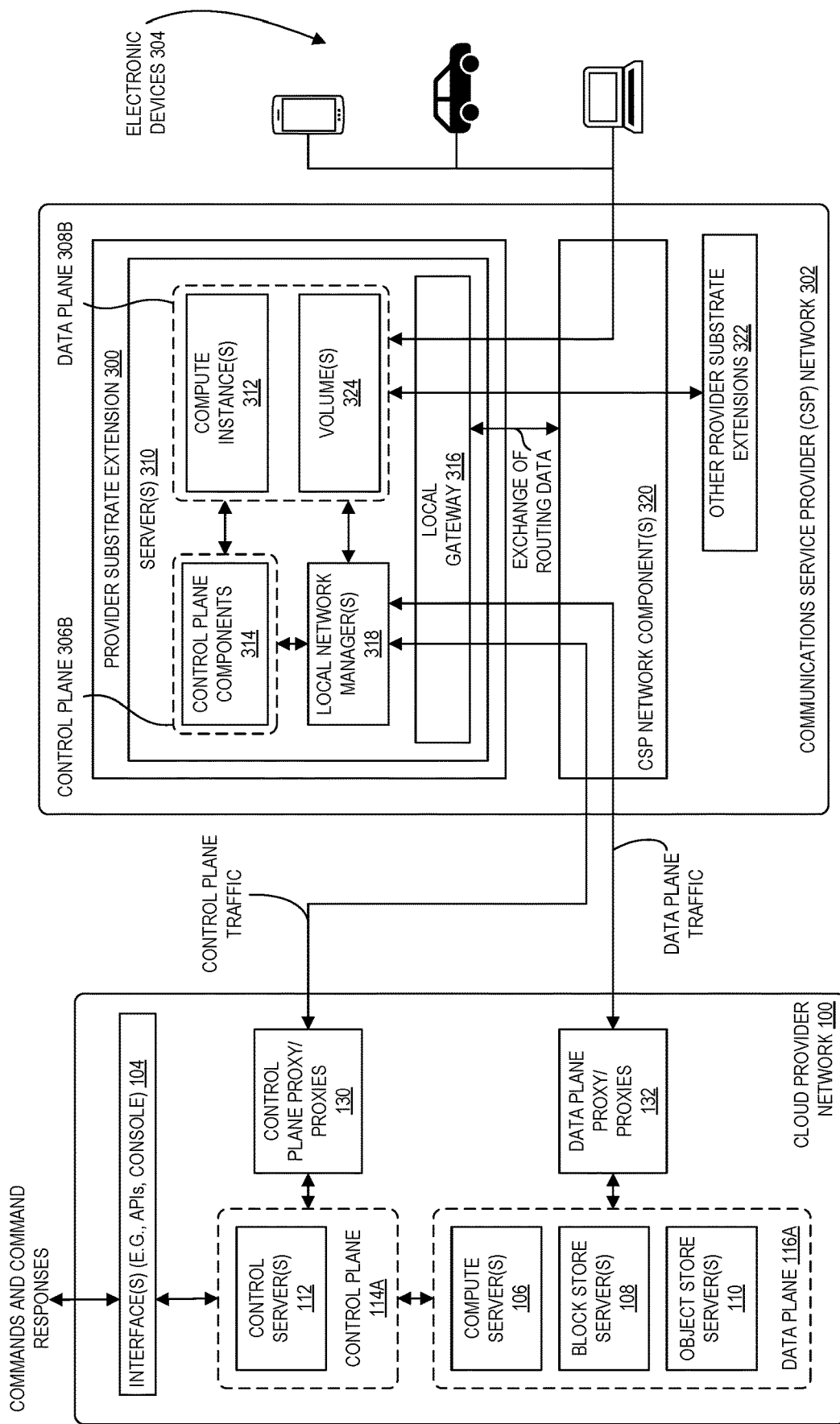
FIG. 3 illustrates in greater detail exemplary components of and connectivity between a cloud provider network and a provider substrate extension within a communications service provider network according to some embodiments.

FIG. 3 illustrates in greater detail exemplary components of and connectivity between a cloud provider network and a provider substrate extension within a communications service provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations.

For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 100 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
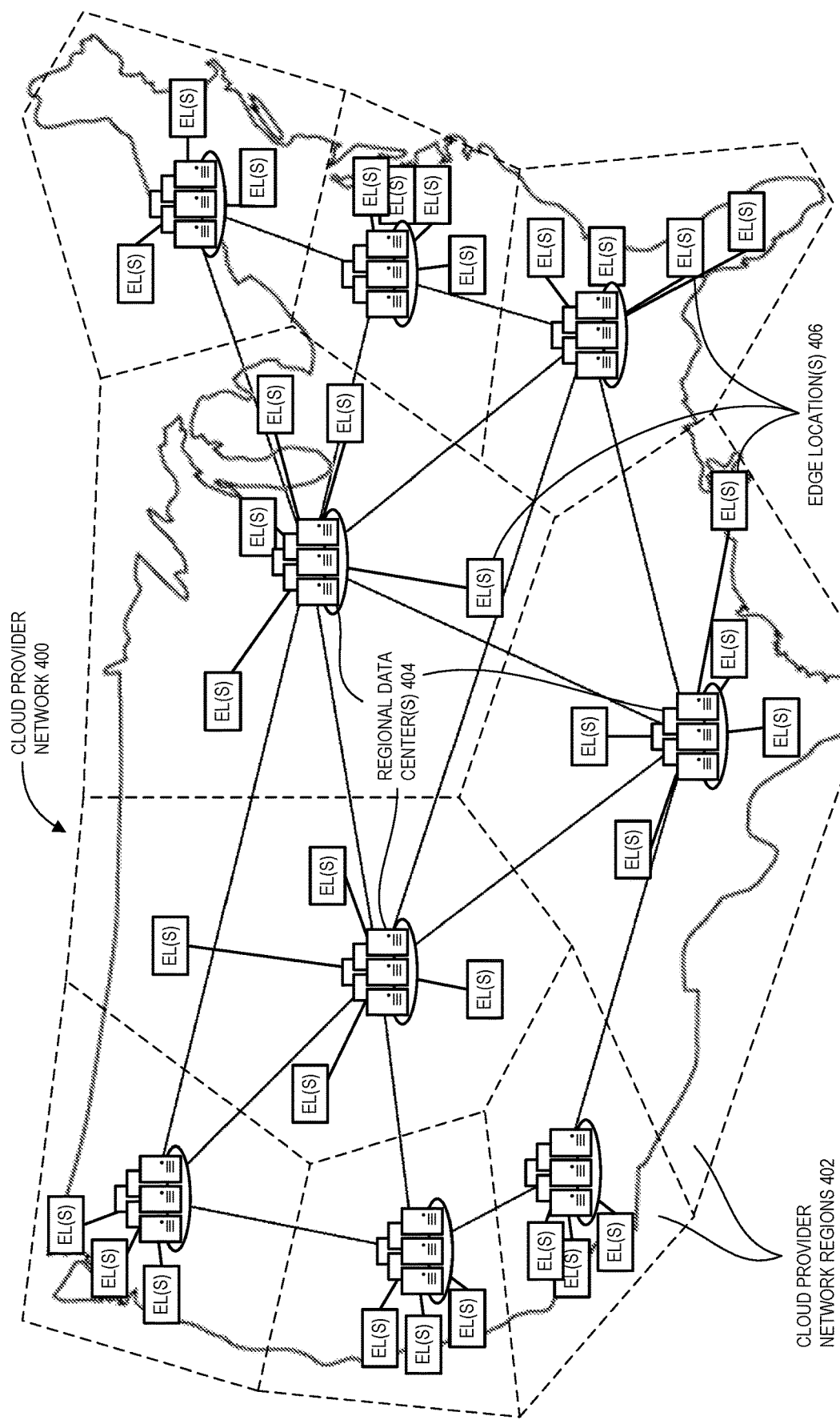
FIG. 4 illustrates an exemplary cloud provider network including geographically dispersed provider substrate extensions (or "edge locations") according to some embodiments.

FIG. 4 illustrates an exemplary cloud provider network including geographically dispersed provider substrate extensions (or "edge locations") according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers, instead of the edge location infrastructure described herein.

As indicated herein, a cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

Some cloud provider networks are expanding the definition of a traditional availability zone to include new kinds of provider substrate extension locations—including, for example, near zones (e.g., zones associated with disconnected control planes), 5G-enabled wavelength zones (connected to carrier networks, etc.), etc. It is desirable to enable customers to deploy computing resources across these zones without breaking backward compatibility assumptions about existing availability zones within a cloud provider network. According to embodiments described herein, a cloud provider network defines a set of "availability zone groups" used to group these new types of provider substrate extensions. In some embodiments, each availability zone group is defined such that includes a set of provider substrate extensions with a similar set of characteristics and capabilities (e.g., a set of provider substrate extensions in a similar geographic area, a set of provider substrate extensions associated with communication service providers, etc.).

In some embodiments, the provider substrate extensions that form an availability group may offer a subset of the services provided generally by the cloud provider network with which they are associated. Among other benefits, the extension of the cloud provider network brings these cloud provider services such as, for example, hardware virtualization services, storage services, etc., closer to end users, providing such users with low latency access to the applications running locally. Furthermore, these availability groups may be connected to data centers within a region of the cloud provider network via redundant and high bandwidth private network backbones, giving applications running in the availability groups fast, secure, and seamless access to other cloud provider services. In some embodiments, the availability zones and provider substrate extensions within an availability group may each be equipped with independent power, cooling, and physical security, and are connected to other provider substrate extensions within the group via low latency network connections.

To enable users to discover and use these new availability zone groups, a cloud provider network includes APIs and graphical user interfaces (GUIs) that can be used to query availability zone groups, to opt-in or otherwise enable selected availability zone groups, and to deploy computing resources at provider substrate extensions within enabled availability groups. Furthermore, once enabled, users can add subnets to enabled groups and perform other actions typically performed relative to traditional availability zones of a cloud provider network. In some embodiments, the APIs enabling querying of availability zone groups provide both static and dynamic information about availability zone groups (e.g., types of capabilities supported by each group, types of cloud provider services supported by each group, latency information associated with each group, capacity availability within each group, etc.). The use of an opt-in mechanism for availability zone groups, for example, enables customers to have control over the types of availability zone groups they would like to target for their workloads.

Figure 5:
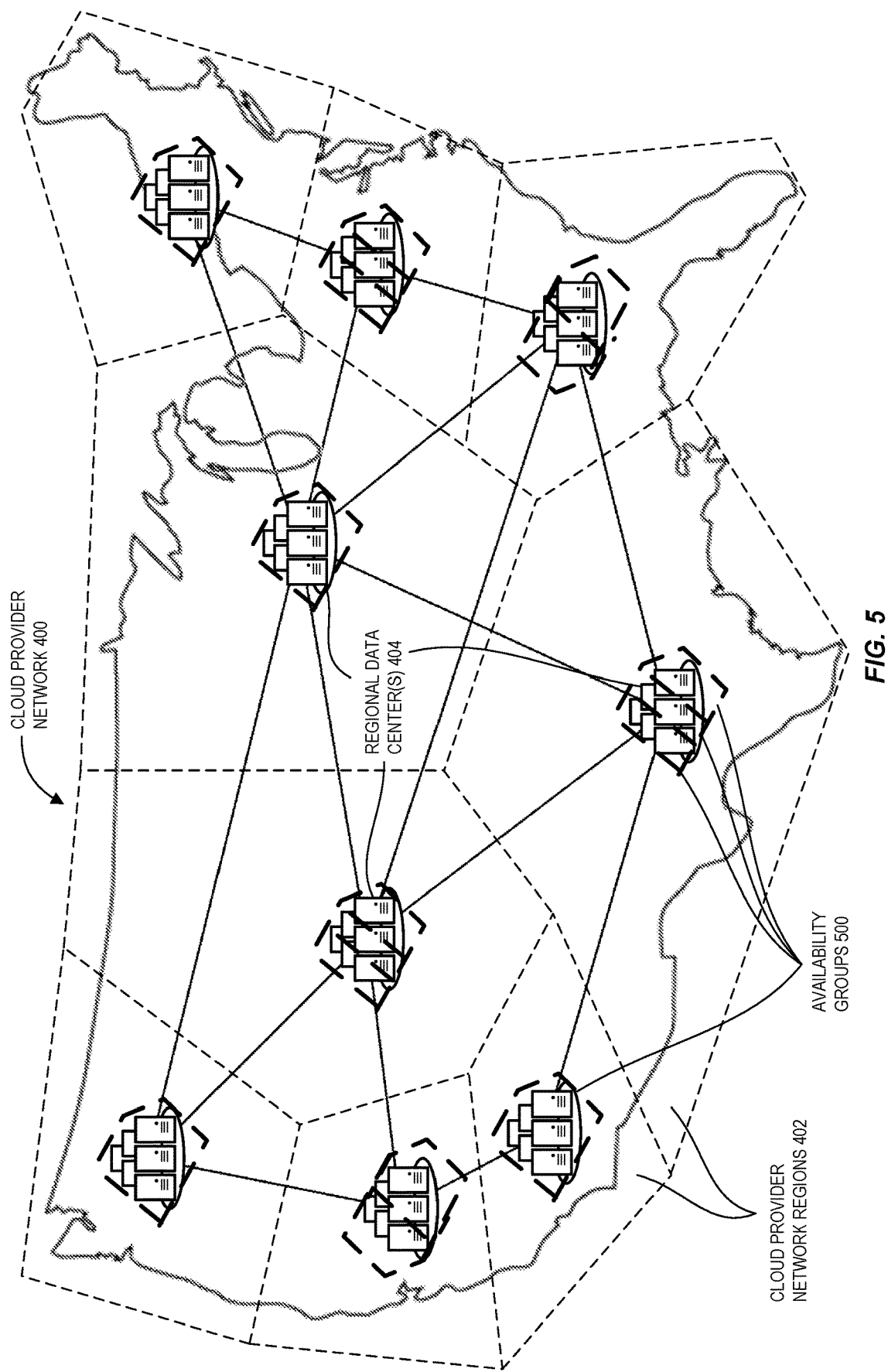
FIG. 5 illustrates an exemplary cloud provider network including geographically dispersed availability groups of provider substrate extensions offered by a cloud provider according to some embodiments.

FIG. 5 illustrates an exemplary cloud provider network including geographically dispersed availability groups of provider substrate extensions according to some embodiments.

As illustrated, FIG. 5 includes a map of the United States and surrounding areas overlaid with several availability groups (e.g., availability groups 500 within various regions of the cloud provider network 400). In some embodiments, each availability group is "parented" to a corresponding region 402 of the provider network and includes one or more provider substrate extension locations. As described herein, being parented to a region refers to the edge locations within an availability group being controlled at least in part by the control plane of that region (or of one or more availability zones within that region). The cloud provider network can include components for programmatically assigning edge locations to particular regions (e.g., based on a time required for communications between the region and the edge location) and for grouping similar edge locations (e.g., edge locations that are: parented to the same region, attached to the same third party network, outposts of the same customer, have a certain latency range to a target geography, etc.) together to form an availability group. The particular edge locations included in an availability group may be dynamically updated as new edge locations are added, as existing edge locations are modified (e.g., as their capacity is filled or released, as their latency in communications back to the region or to end users change), or as latency criteria are modified.

In some embodiments, as described in more detail herein, each availability zone generally includes a set of provider substrate extension locations having a defined set of characteristics and capabilities. For example, one availability zone might represent cloud provider-managed provider substrate extensions in the Los Angeles area, while another availability zone might represent provider substrate extensions in the Austin area that are located in facilities associated with one or more communications service providers (e.g., and thus may provide low latency access to users of a 5G network in the area), and so forth.

Figure 6:
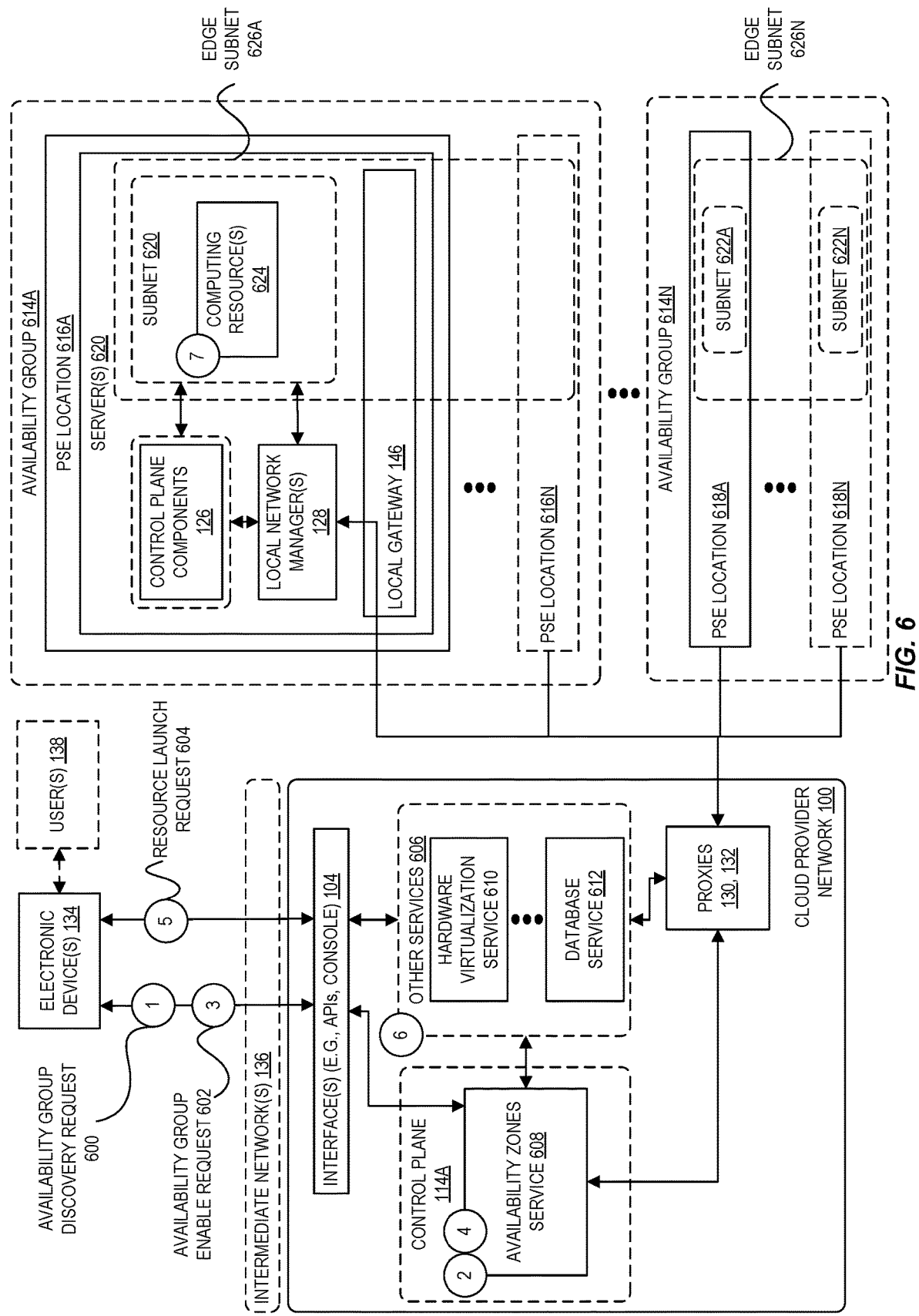
FIG. 6 is a diagram illustrating an environment in which users request information about availability groups offered by a cloud provider, enable the use of one or more availability groups, and launch computing resources into an availability group according to some embodiments.

FIG. 6 is a diagram illustrating an environment in which users request information about availability groups offered by a cloud provider, optionally enable the use of selected availability groups, and launch computing resources into availability groups according to some embodiments. For example, the numbered circles "1"-"7" in FIG. 6 illustrate a process that includes a user requesting information about availability groups offered by a cloud provider network 100, enabling an availability group for use by a user account associated with the user, and launching a computing resource into an identified availability group (e.g., into a provider substrate extension location 612A that is a part of an enabled availability group 614A of availability groups 614A-614N). The environment illustrated in FIG. 6 also shows the optional configuration of various edge subnets 626A- 626N, each of which may span one or more provider substrate extension locations. In some embodiments, such edge subnets may be used as a logical representation of one or more respective underlying subnets associated with individual provider substrate extension locations (e.g., provider substrate extensions associated with a same edge zone).

At circle "1" in FIG. 6, a user generates an availability group discovery request 600 to obtain information about availability groups offered by a cloud provider network 100. As indicated above, communications between electronic device(s) 134 and the provider network 100 can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like. In some embodiments, at circle "2," an availability zones service 608, or availability group service, processes the request 602 and returns information about availability groups satisfying the user request (for example, information about all availability groups 614A-614N or about availability groups matching user-specified criteria, where each availability group includes one or more of provider substrate extensions 616A-616N, 618A-618N).

In some embodiments, an availability group describe request 600 can include an action name indicating that information about availability groups offered by the cloud provider network 100 is desired (e.g., "csp edge describe-availability-groups") and other possible parameters related to desired criteria for availability groups. The criteria may include, for example, indications of particular types of availability groups of interest, indications of particular communications service providers of interest, indications of particular geographic areas of interest, indications of a desired latency profile, and the like. The following is an example format for a describe availability groups request including a filter parameter indicating selected communication service providers of interest:

```
csp psec describe-availability-zones --region {us-east-1, us-west-2}
[--filters carrier = {carrier1, carrier2, carrier3}]
```

The following is an example format for a response from the cloud provider network 100 to a describe availability zones request:

```
{
    "AvailabilityZones": [
        {
            "State": "available",
            "OptInStatus": "opt-in-not-required",
            "Messages": [ ],
            "RegionName" : "us-west-2",
            "ZoneName": "us-west-2a",
                "ZoneId" : "usw2-az2",
            "GroupName": "us-west-2-ogn-1"
        },
        {
            "State": "available",
            "OptInStatus": "opt-in-not-required",
            "Messages": [ ],
            "RegionName" : "us-west-2",
            "ZoneName": "us-west-2b",
                "ZoneId" : "usw2-az1",
            "GroupName": "us-west-2-ogn-1"
        },
        {
            "State": "available",
            "OptInStatus": "not-opted-in",
            "Messages": [ ],
            "RegionName": "us-west-2",
            "ZoneName": "us-west-2-los-1a"
                "ZoneId" : "usw2-los1-az1",
            "GroupName": "us-west-2-los-1"
}
```

As illustrated, the response can include information about traditional availability zones (e.g., indicated by the OptIn-Status parameter value "opt-in-not-required") as well as availability groups (e.g., indicated by the OptInStatus parameter value "not-opted-in"), indicating that the availability zone group requires that the user opt-in to deploy resources within the availability zone group.

In some embodiments, the information returned for each availability group returned can include any of: a state of the availability group, a region with which the availability is associated, a name of the availability group, an identifier of the availability group, one or more cloud provider services available for use with the availability group, a latency profile for the availability group relative to a defined geographic area, an indication of available capacity in the availability group, an indication of scalability in the availability group (e.g., an indication that a user would likely be able to scale a particular workload up to 5× or 10× in a particular availability group, etc.) and an indication of one or more types of networks accessible to the availability group. This information can be used, for example, to identify availability groups associated with provider substrate extensions that satisfy a use case of interest to a user of the cloud provider network.

At circle "3" in FIG. 6, a user optionally generates an availability group enable request 600 to enable use of one or more selected availability groups. For example, a user can use a console or other interface to generate a request including an identifier of the availability group to be enabled (e.g., "us-west-2-los-1" in the example above) and an indication of a desire to enable use of the availability group. In some embodiments, at circle "4," an availability zones service 608 processes the request 602 by storing data indicating that the identified availability groups(s) are enabled for use by the requesting user account. Once enabled, the user can optionally request additional information about the enabled availability group, launch supported types of computing resources into the availability group, use launch templates to launch resources, associate auto scaling policies, among other possible actions.

In some embodiments, a user can opt-in to only selected availability zones or provider substrate extensions within an availability group. For example, one availability group might include provider substrate extensions associated with two or more different communications service providers, and a user might desire to use only those provider substrate extensions associated with one or more selected communications service providers (e.g., provider substrate extensions associated with a first cellular carrier but not those associated with a second cellular carrier). In some embodiments, a user can request the creation of a custom availability group including only a selected set of availability zones or provider substrate extensions of interest to the user. The creation of a custom availability group, for example, can include an availability group that includes one or more customer-managed provider substrate extensions that are accessible to only a defined set of user accounts. Although many examples described herein include an explicit opt-in from a user account to use an availability group, in other embodiments, an opt-in mechanism is not used, and users can use any availability group identified by the user in a resource launch request or other action whether enabled or not.

The following is an example format for an API command used to enable or disable an availability group:

```
csp psec modify-availability-zone-groups
--availability-zone-group <value>
--enable | --disable
[--dry-run | --no-dry-run]
[--cli-input-json <value >]
[--generate-cli-skeleton <value >]
```

FIG. 7 illustrates an example graphical user interface (GUI) in which a user can enable or disable various availability groups according to some embodiments. As illustrated, the interface 700 includes an interface element 702 displaying a list of availability zones within a particular region that are enabled by default (e.g., the us-west-2a, us-west-2b, etc., availability zones enabled by default in the "US West (Oregon)" region). The interface 700 further includes an interface element 704 displaying an availability group including a set of optionally enabled availability zones (e.g., the availability zones associated with the "US West (Log Angeles)" availability group can be enabled by selecting the "Enabled" toggle button 706). Once enabled, for example, the availability zones associated with the enabled availability group can be used to host resources launched by the associated user account. FIG. 7 further illustrates a separate interface element 708 displaying a list of availability zones associated with a currently disabled availability group "US West (Las Vegas)."

Figure 8:
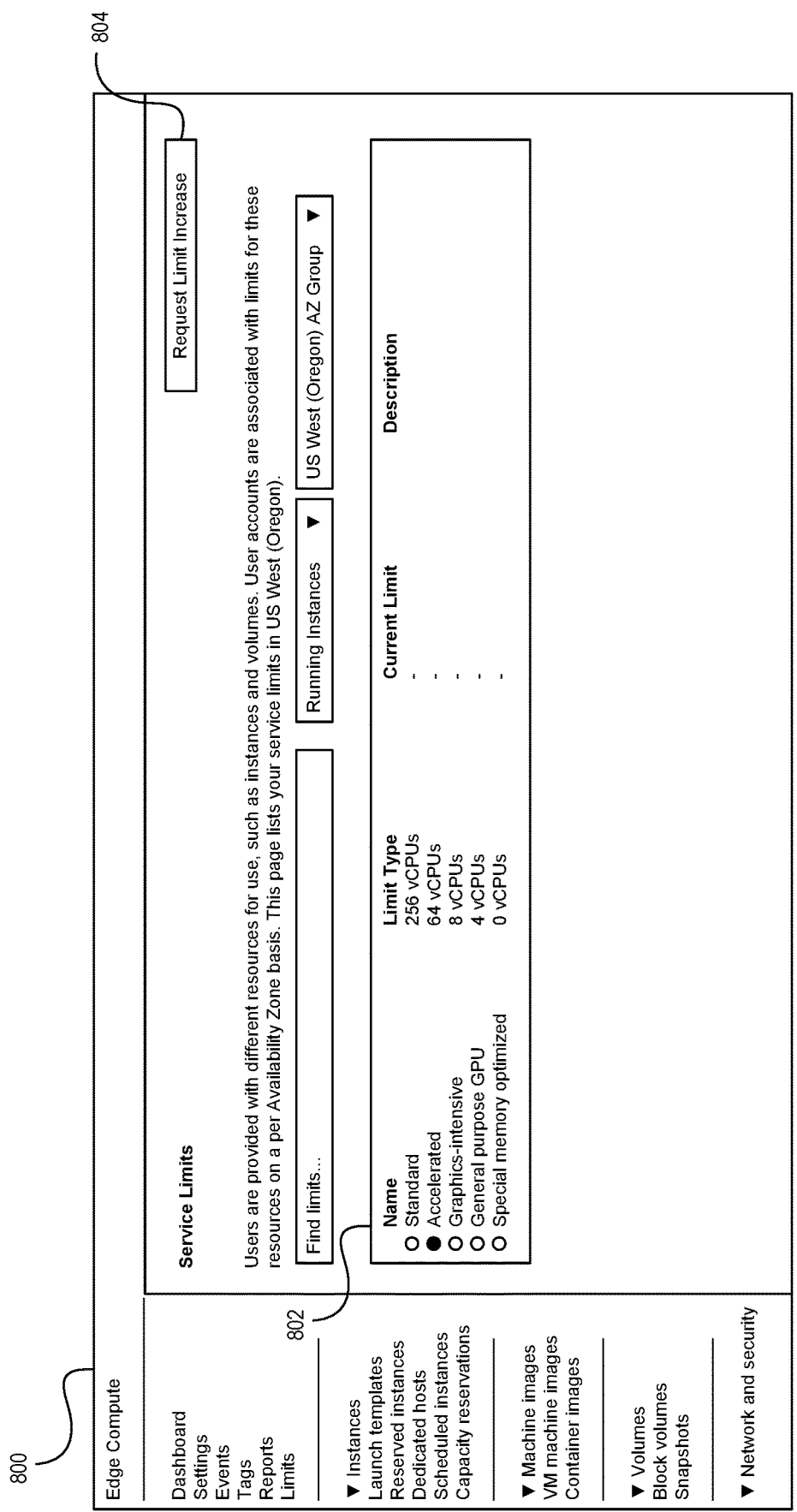
FIG. 8 illustrates an example GUI in which a user can configure service limits for an availability group according to some embodiments.

FIG. 8 illustrates an example GUI in which a user can configure service limits for an availability group according to some embodiments. As illustrated, the interface 800 includes a list 802 indicating various limits for different types of resources that can be launched into an availability group (e.g., the availability group "US West (Oregon) AZ Group" in the example of FIG. 8). In some embodiments, a different set of resource limits may be associated with respective availability groups in the provider substrate extensions associated with each availability group may have different infrastructure capacity used to support distinct customer use cases. In some embodiments, if a user requests resources in an availability group that exceeds the defined limits in the availability group, the launch request fails with a limit exceeded error. In some embodiments, a user can request an increase to the resource limits associated with a user account for an availability group. For example, a user can select the interface element 804 to request an increase in one or more resource limits associated with the user's account.

Figure 9:
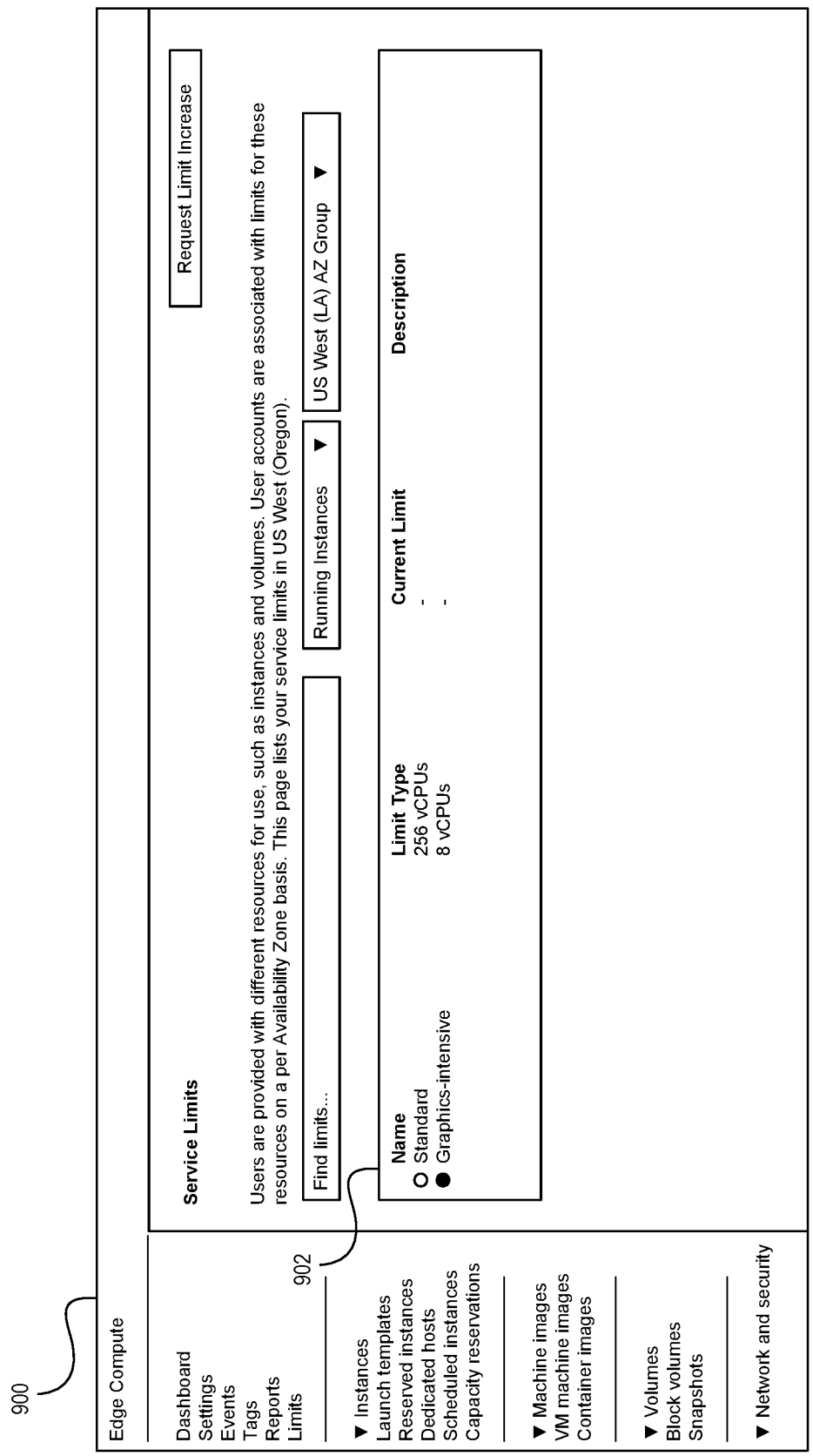
FIG. 9 illustrates another example GUI in which a user can configure service limits for an availability group according to some embodiments.

FIG. 9 illustrates another example GUI in which a user can configure service limits for an availability group according to some embodiments. As illustrated, for example, the interface 900 illustrates in the resource limits list 902 that an availability group (e.g., "US West (Los Angeles) AZ Group") different from the one shown in FIG. 8 may support a different set of available resources and limits.

As indicated above, once an availability group has been enabled by a user, users can launch computing resources (e.g., compute instances, container instances, databases, etc.) into the availability group by identifying the availability group (e.g., based on an identifier of the availability group), and optionally further identifying an application profile for the instances to be launched. For example, at circle "5" in FIG. 6, a user might cause the generation of a resource launch request 604 to launch some number of computing resources into an identified availability group. In some embodiments, the control plane of the cloud provider network 100 performs validation to ensure that the user has enabled the requested availability group, that the availability group supports the requested type of computing resource, that the user is within any relevant resource limits associated with the availability group, among other possible validations.

In some embodiments, a user can make use of an availability group without performing the discovery and enablement processes described above. For example, a user can cause generation of an API request to automatically enable any availability groups matching specified constraints (e.g., matching constraints related to user-specified CPU, memory, latency, geographic, time of use, requirements). In this example, the cloud provider network 100 can automatically identify availability groups that include provider substrate extensions matching the specified criteria and automatically enable use of those availability groups for the user. In some embodiments, similar constraints may be specified as part of a resource launch request, and the cloud provider network 100 can automatically identify availability group(s) satisfying the criteria of the launch request, optionally enable the identified availability groups, and launch the resources into an identified availability group. In some embodiments, if an availability group satisfying a user's specified criteria does not exist (e.g., because any satisfactory availability groups are at capacity or because a satisfactory availability group does not exist), the cloud provider network 100 can generate an alert for the associated user account once a satisfactory availability group becomes available in the future. In some embodiments, such user requests can be used by the cloud provider network 100 to identify availability groups that may benefit from additional capacity or to identify new types of availability groups to offer to users. In some embodiments, upon receiving an indication of a user's availability group criteria, a cloud provider network 100 automatically enables (and possibly disables) availability groups that satisfy the user's criteria as new availability groups are added, modified, or removed in the system.

In some embodiments, at circle "6," such launch requests are received by a relevant service of the cloud provider network 100 (e.g., a hardware virtualization service 610 used to launch compute instances, a database service 612 used to launch database instances, etc.), which may include several components (e.g., a placement manager, network manager, and storage manager, etc.) that are used to collectively identify one or more provider substrate extension locations within the identified availability group at which compute instances can be launched to satisfy the parameters identified in an identified application profile or in request itself The number of identified provider substrate extension locations may depend on a large number of constraints specified in an identified application profile as indicated above. In some embodiments, a service receiving a request to launch a computing resource into an availability group can determine, based on information obtained from the availability zones service 608, whether a user account associated with the launch request has enabled the launch of computing resource into the specified availability group. If the user has not enabled launches into the availability group, the service may return an error message to the requesting client device, or return a message requesting whether the user desires to enable launches into the availability group. If the client device responds with a message indicating that the user desires to enable the availability group, the launch process can proceed.

Once a provider substrate extension is identified, and assuming the associated user account has enabled launches into the corresponding availability group, the service 606 sends instructions to a local network manager 128 at a selected PSE location requesting the launch of the computing resources (e.g., compute resources 624). In some embodiments, at circle "7," the requested computing resources 624 can then be launched at one or more servers within the provider substrate extension and further associated with a subnet (e.g., compute resources 614 associated with a subnet 620 based on an assignment of an IP address in the subnet range to a virtual adapter associated with the computing resources, if applicable).

In some embodiments, a user can associate an auto scaling policy with an availability group indicating whether the user desires to ensure that additional compute instances launched based on the auto scaling policy are launched within the same availability zone or provider substrate extension, within the same availability group, or if new instances may be launched within other availability groups/zones. In some embodiments, a scaling policy can include an indication that an associated workload can be scaled to locations outside of the availability group (e.g., including at in-region data centers of the cloud provider network 100). In some embodiments, users can also allocate pools of network addresses (e.g., IPv4 or IPv6 addresses) to an availability group, and the cloud provider network 100 can assign network addresses from the assigned pools to resources deployed into the availability group.

Figure 10:
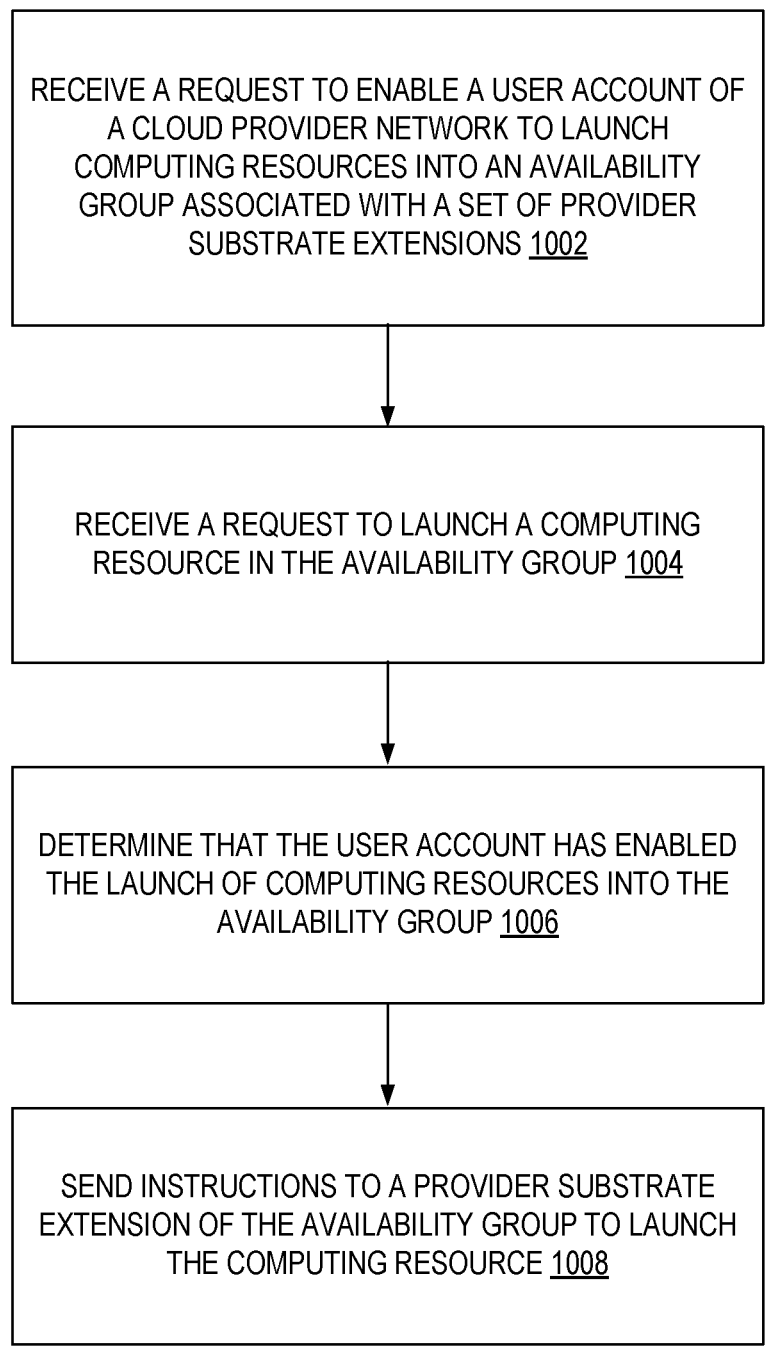
FIG. 10 is a flow diagram illustrating operations of a method for receiving a request to enable use of an availability group by a user account of a cloud provider network and, responsive to a request to launch a computing resource into an availability group, launching a computing resource at a provider substrate extension of the availability group according to some embodiments.

FIG. 10 is a flow diagram illustrating operations 1000 of a method for receiving a request to enable use of an availability group by a user account of a cloud provider network and, responsive to a request to launch a computing resource into an availability group, launching a computing resource at a provider substrate extension of the availability group according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by availability zones service 608 of the other figures.

The operations 1000 include, at block 1002, receiving a request to enable a user account of a cloud provider network to deploy computing resources at a set of provider substrate extensions associated with an availability group. In some embodiments, provider substrate extensions of the availability group offer a subset of a set of computing services provided by the cloud provider network and are further associated with a latency profile relative to a defined geographic area.

In some embodiments, the operations further include receiving a request to describe availability groups provided by the cloud provider network; and sending a response including information for each of a set of availability groups, the information for each availability group in the set of availability groups including at least one of: a state of the availability group, a region with which the availability is associated, a name of the availability group, an identifier of the availability group, one or more cloud provider services available for use with the availability group, a latency profile for the availability group relative to a defined geographic area, an indication of available capacity in the availability group, an indication of workload scalability in the availability group, or an indication of one or more types of networks accessible to the availability group.

The operations 1000 further include, at block 1004, receiving a request to launch a computing resource in the availability group. In some embodiments, the request to launch the computing resource in the availability group specifies the provider substrate extension of the set of provider substrate extensions.

The operations 1000 further include, at block 1006, determining that the user account has enabled the launch of computing resources into the availability group.

The operations 1000 further include, at block 1008, sending instructions to a provider substrate extension of the availability group to launch the computing resource. In some embodiments, the computing resource is at least one of: the computing resource is at least one of: a virtual machine (VM) instance, a container instance, a relational database, a NoSQL database, a block storage volume, an on-demand executable function, a virtual network, an automatic scaling policy, a batch computing job, an in-memory cache, a content delivery network (CDN) service instance, a MapReduce service instance, a data stream processing service instance, an application programming interface (API) gateway service instance, a simple notification service (SNS) service instance, an Internet of Things (IoT) service instance, a machine learning (ML) service instance, a video transcoding service instance.

In some embodiments, the provider substrate extension is connected to a private network of a communications service provider and is controlled at least in part by a control plane service of a cloud provider network via a connection through at least a portion of the private network. In some embodiments, the provider substrate extension includes one of: a network formed by servers located in a facility managed by a customer of a cloud provider network, a network formed by servers located in a facility associated with a communications service provider, a network formed by servers located in a facility managed by a cloud provider and controlled at least in part by a separate control plane of a cloud provider network.

In some embodiments, the request to enable the user account of the cloud provider network to deploy computing resources at a set of provider substrate extensions associated with an availability group includes an indication of a subset of the set of provider substrate extensions associated with the availability group, and the operations further include selecting the provider substrate extension at which to launch the computing resource from the subset of the set of provider substrate extensions.

In some embodiments, the operations further include receiving a request to associate a subnet with the availability group, and creating a subnet in association with at least one provider substrate extension of the set of provider substrate extensions. In some embodiments, the operations further include receiving a request to disable the user account from deploying computing resources at the set of provider substrate extensions associated with the availability group. In some embodiments, the operations further include receiving a request to associate a scaling policy with the availability group, the scaling policy indicating whether to scale resources outside of the availability group.

In some embodiments, the request to enable the user account of the cloud provider network to launch computing resources into the availability group includes workload criteria, the workload criteria including at least one of: an indication of a type of provider substrate extension, an indication of a communications service provider, an indication of a geographic area, or a desired latency profile, and wherein the method further comprises identifying one or more provider substrate extensions satisfying the workload criteria.

In some embodiments, the operations further include receiving a request including criteria associated with deployment of a workload associated with the user account, determining that a new availability group satisfies the criteria associated with deployment of the workload, and generating a notification for the user account indicating that the new availability group satisfies the criteria associated with deployment of the workload. In some embodiments, the operations further include receiving a request including criteria associated with deployment of a workload associated with the user account, determining that a new provider substrate extension satisfies the criteria associated with deployment of the workload, and adding the provider substrate extension to the availability group.

Figure 11:
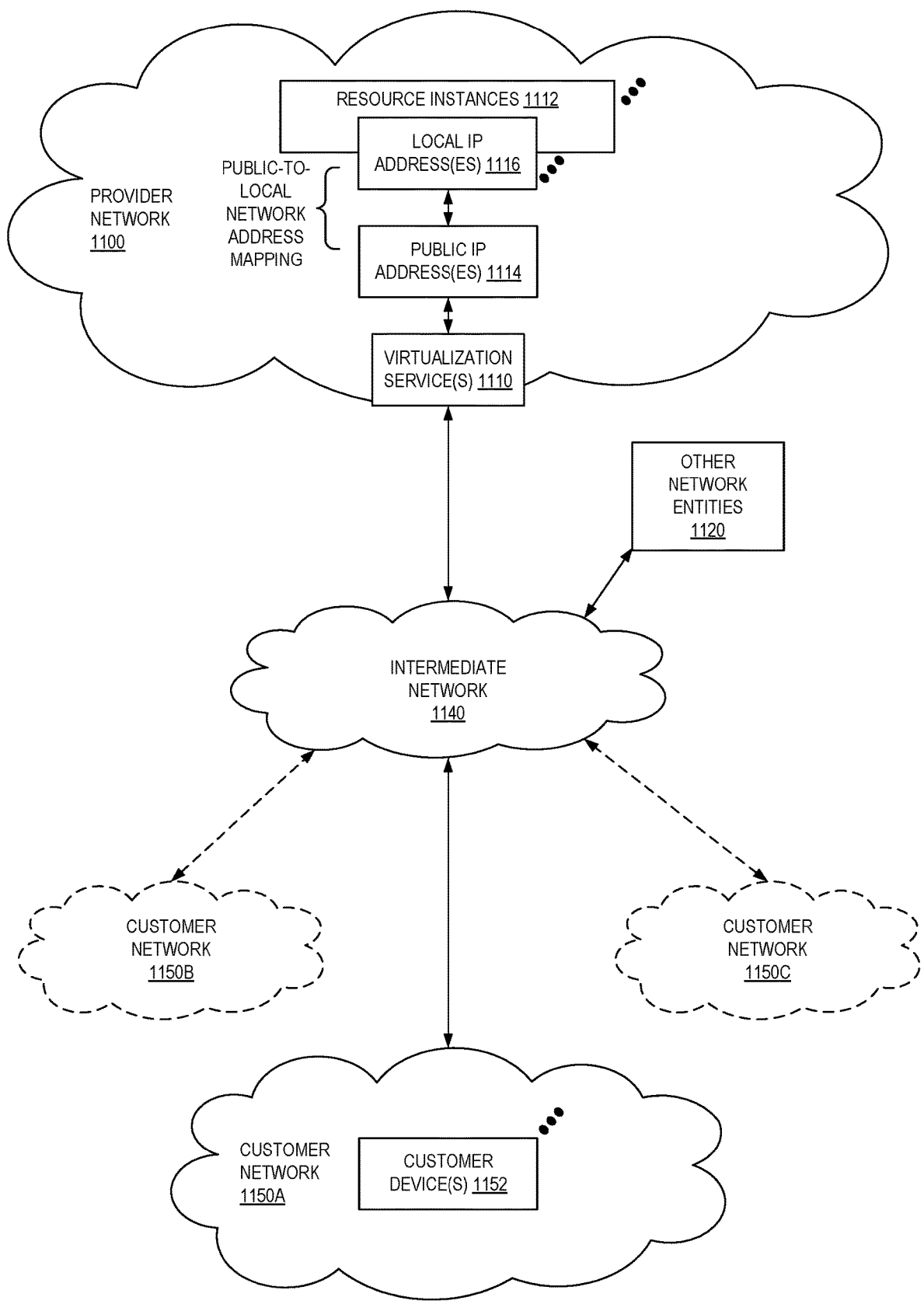
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
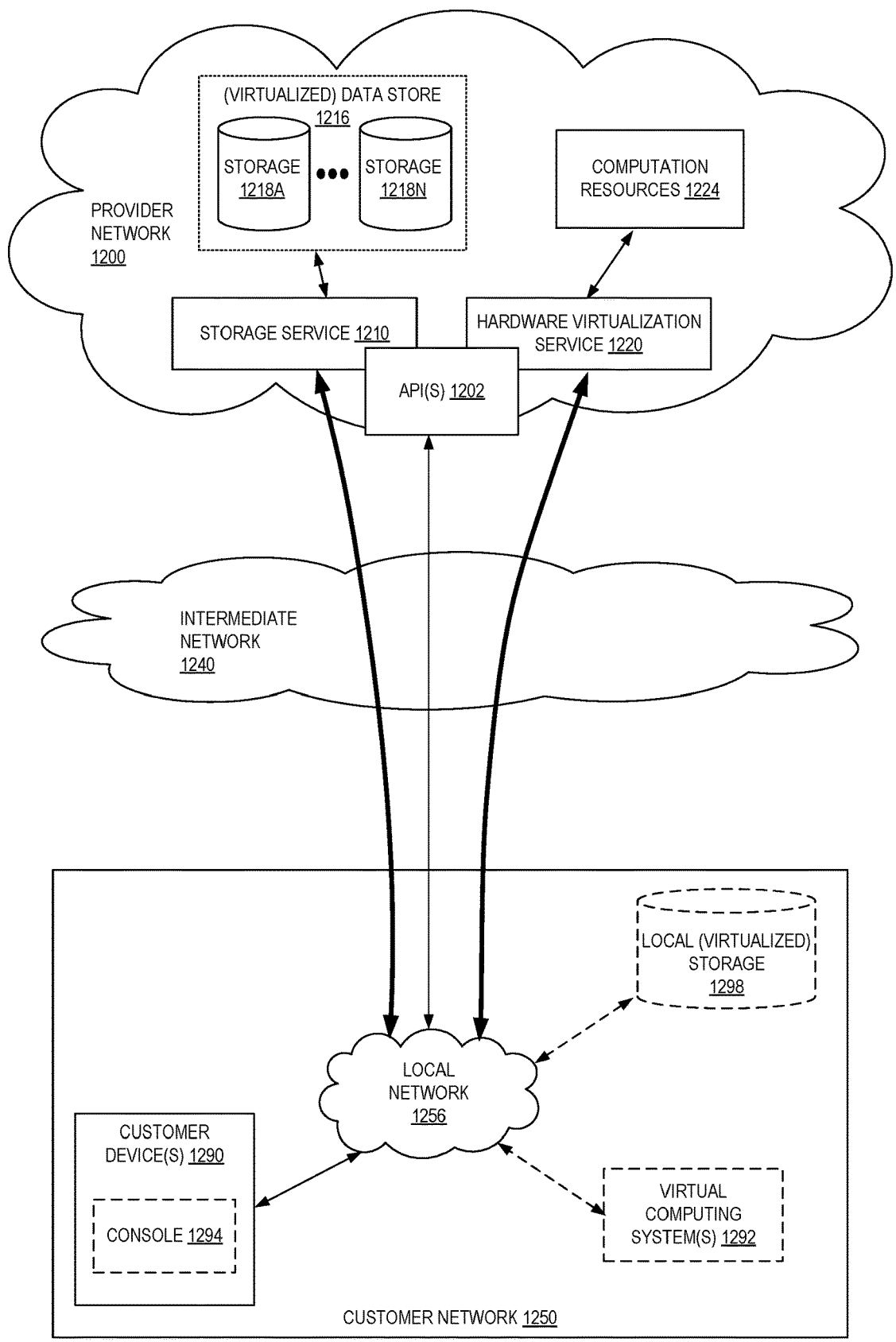
FIG. 12 is a block diagram of an example provider network that provides a storage service and a hardware virtualization service to customers according to some embodiments.

FIG. 12 is a block diagram of an example provider network that provides a storage service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some embodiments, a virtualized data store gateway (not shown) may be provided at the customer network 1250 that may locally cache at least some data, for example frequently-accessed or critical data, and that may communicate with storage service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative Systems

Figure 13:
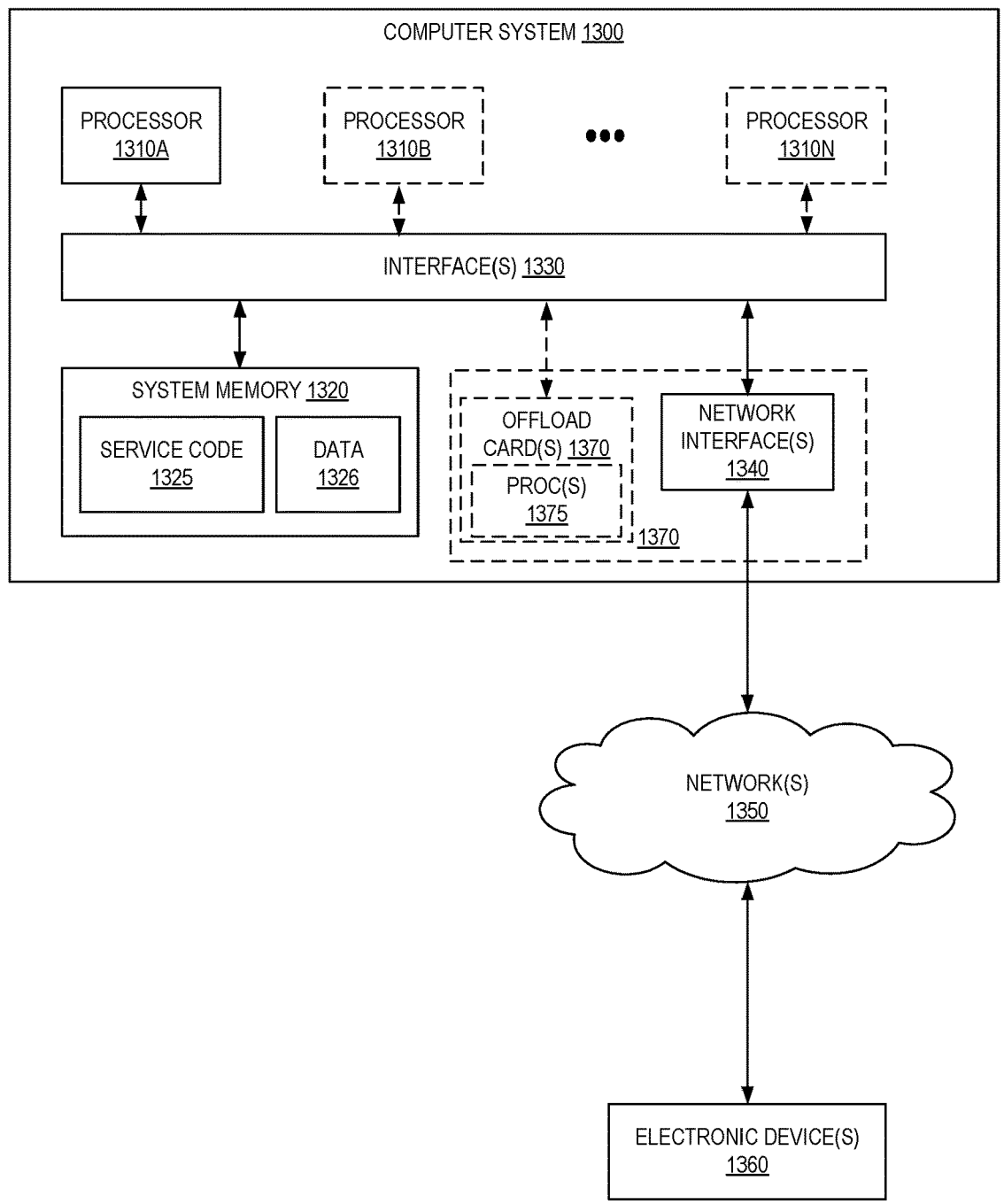
FIG. 13 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as service code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1218A-1218N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to enable a user account of a cloud provider network to deploy computing resources within an availability group, wherein the availability group is associated with at least one provider substrate extension of a cloud provider network, and wherein each of the at least one provider substrate extension:
   includes a computer system that provides capacity for execution of customer compute instances, and
   is controlled at least in part by a control plane of the cloud provider network;
   receiving a request to associate a first subnet with the availability group, wherein the first subnet is associated with a virtual private cloud (VPC) of the cloud provider network, and wherein the VPC includes a second subnet associated with a region of the cloud provider network;
   receiving a request associated with the user account to launch a computing resource in the availability group;
   determining that the user account has enabled launching computing resources into the availability group; and
   sending instructions to a provider substrate extension of the availability group to launch the computing resource, wherein the computing resource is launched in the first subnet associated with the availability group.

2. The computer-implemented method of claim 1, the method further comprising:
   receiving a request to describe availability groups provided by the cloud provider network; and
   sending a response including information for each of a set of availability groups, the information for each availability group in the set of availability groups including at least one of: a state of the availability group, a region with which the availability group is associated, a set of availability zones within the availability group, a name of the availability group, an identifier of the availability group, one or more cloud provider services available for use with the availability group, a latency profile for the availability group relative to a defined geographic area, an indication of available capacity in the availability group, an indication of workload scalability in the availability group, or an indication of one or more types of networks accessible to the availability group.

3. The computer-implemented method of claim 1, wherein provider substrate extensions of the availability group offer a subset of a set of computing services provided by the cloud provider network and are associated with a latency profile relative to a defined geographic area.

4. A computer-implemented method comprising:
   receiving a request to enable a user account of a cloud provider network to deploy computing resources within an availability group, wherein the availability group is associated with an edge location inside a cellular service provider network;
   receiving a request to associate a first subnet with the availability group, wherein the first subnet is associated with a virtual network of the cloud provider network, and wherein the virtual network includes a second subnet associated with a region of the cloud provider network;
   receiving a request to launch a computing resource in the availability group; and
   sending instructions to the edge location of the availability group to launch the computing resource, wherein the computing resource is launched in the first subnet.

5. The computer-implemented method of claim 4, the method further comprising:
   receiving a request to describe availability groups provided by the cloud provider network; and
   sending a response including information for each of a set of availability groups, the information for each availability group in the set of availability groups including at least one of: a state of the availability group, a region with which the availability group is associated, a set of availability zones within the availability group, a name of the availability group, an identifier of the availability group, one or more cloud provider services available for use with the availability group, a latency profile for the availability group relative to a defined geographic area, an indication of available capacity in the availability group, an indication of workload scalability in the availability group, or an indication of one or more types of networks accessible to the availability group.

6. The computer-implemented method of claim 4, wherein the edge location of the availability group offers a subset of a set of computing services provided by the cloud provider network and is associated with a latency profile relative to a defined geographic area.

7. The computer-implemented method of claim 4, wherein the availability group is associated with a plurality of edge locations, and wherein the request to launch the computing resource in the availability group specifies the edge location.

8. The computer-implemented method of claim 4, wherein the request to launch the computing resource is a first request to launch a first computing resource, and wherein the method further comprises:
receiving a second request to disable the user account from deploying computing resources at the availability group;
receiving a third request to launch a second computing resource in the availability group; and
denying the third request.

9. The computer-implemented method of claim 4, wherein the request to enable the user account of the cloud provider network to deploy computing resources within the availability group includes an indication of a subset of a plurality of edge locations associated with the availability group, and wherein the method further includes selecting the edge location at which to launch the computing resource from the subset of the plurality of edge locations.

10. The computer-implemented method of claim 4, further comprising receiving a request to associate a scaling policy with the availability group, wherein the scaling policy indicates whether to scale resources outside of the availability group.

11. The computer-implemented method of claim 4, wherein the computing resource is at least one of: a virtual machine (VM) instance, a container instance, a relational database, a NoSQL database, a block storage volume, an on-demand executable function, a virtual network, an automatic scaling policy, a batch computing job, an in-memory cache, a content delivery network (CDN) service instance, a MapReduce service instance, a data stream processing service instance, an application programming interface (API) gateway service instance, a simple notification service (SNS) service instance, an Internet of Things (IoT) service instance, a machine learning (ML) service instance, a video transcoding service instance.

12. The computer-implemented method of claim 4, wherein the edge location is connected to a private network of a communications service provider and is controlled at least in part by a control plane service of a cloud provider network via a connection through at least a portion of the private network.

13. The computer-implemented method of claim 4, wherein the edge location includes one of: a network formed by servers located in a facility managed by a customer of a cloud provider network, a network formed by servers located in a facility associated with a communications service provider, a network formed by servers located in a facility managed by a cloud provider and controlled at least in part by a separate control plane of a cloud provider network.

14. The computer-implemented method of claim 4, wherein the request to enable the user account of a cloud provider network to deploy computing resources within the availability group includes workload criteria, wherein the workload criteria includes at least one of: an indication of a type of edge location, an indication of a communications service provider, an indication of a geographic area, or a desired latency profile, and wherein the method further comprises identifying one or more edge locations satisfying the workload criteria.

15. The computer-implemented method of claim 4, further comprising:
receiving a request including criteria associated with deployment of a workload associated with the user account;
determining that a new availability group satisfies the criteria associated with deployment of the workload; and
generating a notification for the user account indicating that the new availability group satisfies the criteria associated with deployment of the workload.

16. The computer-implemented method of claim 4, further comprising:
receiving a request including criteria associated with deployment of a workload associated with the user account;
determining that an edge location satisfies the criteria associated with deployment of the workload; and
adding the edge location to the availability group.

17. A system comprising:
an availability zones service of a cloud provider network implemented by a first one or more electronic devices, the availability zones service including instructions that upon execution cause the availability zones service to:
receive a request to enable a user account of a cloud provider network to deploy computing resources within an availability group, wherein the availability group is associated with an edge location inside a cellular service provider network,
receive a request to associate a first subnet with the availability group, wherein the first subnet is associated with a virtual network of the cloud provider network, and wherein the virtual network includes a second subnet associated with a region of the cloud provider network,
receive a request to launch a computing resource in the availability group, and
send instructions to the edge location of the availability group to launch the computing resource, wherein the computing resource is launched in the first subnet; and
an edge location located inside a cellular service provider network and including a second one or more electronic devices, the edge location including instructions that upon execution cause the edge location to:
receive the instructions to launch the computing resource, and
launch the computing resource at a computer system of the edge location.

18. The system of claim 17, wherein the instructions upon execution further cause the availability zones service to:
receive a request to describe availability groups provided by the cloud provider network; and
send a response including information for each of a set of availability groups, the information for each availability group in the set of availability groups including at least one of: a state of the availability group, a region with which the availability group is associated, a set of availability zones within the availability group, a name of the availability group, an identifier of the availability group, one or more cloud provider services available for use with the availability group, a latency profile for the availability group relative to a defined geographic area, an indication of available capacity in the availability group, or an indication of one or more types of networks accessible to the availability group.

19. The system of claim 17, wherein the edge location of the availability group offers a subset of a set of computing services provided by the cloud provider network and is associated with a latency profile relative to a defined geographic area.

20. The system of claim 17, wherein the availability group is associated with a plurality of edge locations, and wherein the request to launch the computing resource in the availability group specifies the edge location.

* * * * *